US012634003B2

(12) United States Patent
Wagner

(10) Patent No.: US 12,634,003 B2
(45) Date of Patent: May 19, 2026

(54) OUTSIDE EARTH'S ORBIT COMMUNICATION SYSTEM

(71) Applicant: Jimmy Wagner, Brooklyn, NY (US)

(72) Inventor: Jimmy Wagner, Brooklyn, NY (US)

( * ) Notice: Subject to any disclaimer, the term of this patent is extended or adjusted under 35 U.S.C. 154(b) by 734 days.

(21) Appl. No.: 17/683,909

(22) Filed: Mar. 1, 2022

(65) Prior Publication Data

US 2024/0297710 A1     Sep. 5, 2024

Related U.S. Application Data

(60) Provisional application No. 63/257,959, filed on Oct. 20, 2021.

(51) Int. Cl.
H04B 7/185          (2006.01)
H04B 7/19          (2006.01)
(52) U.S. Cl.
CPC ........... H04B 7/19 (2013.01); H04B 7/18536 (2013.01); H04B 7/18584 (2013.01)

(58) Field of Classification Search
CPC .. H04B 7/19; H04B 7/18534; H04B 7/18545; H04B 7/18539; H04B 7/18547; H04B 7/18584; H04B 7/155
See application file for complete search history.

(56) References Cited

U.S. PATENT DOCUMENTS

2017/0373754 A1* 12/2017 Davis ................. H04B 10/1123
2021/0367664 A1* 11/2021 Akyildiz ............. H04B 7/1851

* cited by examiner

*Primary Examiner* — Tuan Pham
(74) *Attorney, Agent, or Firm* — Barry Choobin; Patent 360

(57) ABSTRACT

A space communication system that includes multiple space communication transfer stations strategically positioned outside an earth's orbit. The space communication transfer stations can detect blind spots on earth and quickly transmit signals from spacefaring objects to the earth.

2 Claims, 1 Drawing Sheet

100

110

120

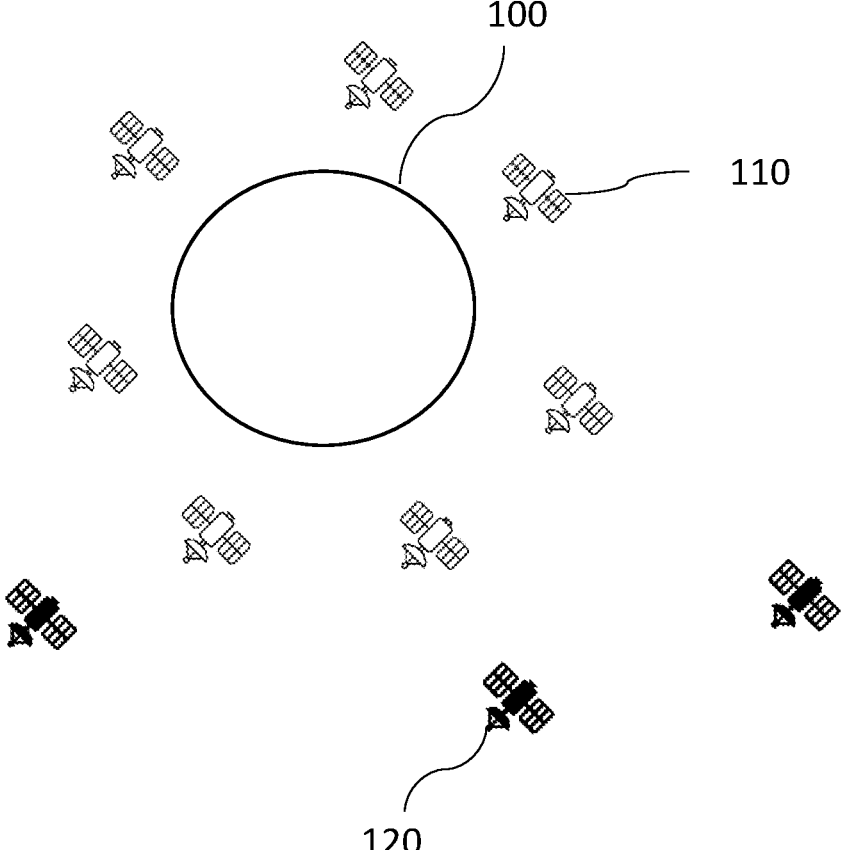

OUTSIDE EARTH'S ORBIT COMMUNICATION SYSTEM

CROSS-REFERENCE TO RELATED APPLICATIONS

This application claims priority to the U.S. provisional patent application Ser. No. 63/257,959, filed on 20 Oct. 2021, which is incorporated herein by reference in its entirety.

FIELD OF INVENTION

The principal object of the present invention is therefore directed to a deep space communication system, and more particularly, the present invention relates to system and method for outside earth's orbit communication system for direct communications between spacefaring objects and between the earth and spacefaring objects.

BACKGROUND

Space exploration activities have been increasing at a very rapid rate with ever-increasing manned and unmanned space missions being planned by many countries. The human desire to settle on a different planet is no longer just an idea. Several plans and strategies have already been proposed to colonize mars. Several deep space missions are being carried out and planned in the future to find life on other planets. Moreover, the number of spacefaring objects has been increasing at a sharp rate.

With the increasing number of spacefaring objects and human space missions and human plans to colonize other planets, a desire for an improved space communication system is there.

The Deep Space Network by NASA is one step forward in the direction of improving space communication. The Deep Space Network includes giant radio antennas strategically position at various locations on earth that can support interplanetary spacecraft communication.

Many other solutions for space communication have been proposed in the art, however, most of the solutions suffer from one or more drawbacks. The major drawback is an extreme time lag in sending and receiving information that can be several minutes, hours, or days. Most of the proposed solutions including the deep space network of NASA require all signals from spacefaring objects to be sent to Earth. The proposed solutions do not address the vast blind spots of earth that result in communication failures or long delays in sending and receiving information. For example, it may take about 11 to 20 minutes for receiving information from mars when Mars and Earth are aligned for direct communication. This time lag can vary significantly depending on the current positions between the sender and receiver. The present space communication solutions are not reliable in emergency situations because of the aforesaid limitations. Moreover, if humans plan to colonize another planet, a better communication system that is available all the time with the least time lags and delays will be needed.

Thus, a need is appreciated for a space communication system that is devoid of the aforesaid drawbacks and limitations of the known space communication systems.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a space communication system that allows communication between spacefaring objects and communication between the spacefaring objects and earth.

It is another object of the present invention to significantly reduce time to send information from one spacefaring object to another spacefaring object.

It is still another object to significantly reduce the duration of transmitting signals from spacefaring objects to earth.

In one aspect, disclosed is a space communication system that includes several satellites strategically positioned outside the earth's orbit.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

FIG. 1 is a schematic diagram showing the space communication system relative to the earth's orbit, according to an exemplary embodiment of the present invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Disclosed is a space communication system that overcomes the drawbacks and limitations of the known space communication systems. The disclosed space communication system can significantly reduce the duration or time lag in sending and receiving information between two spacefaring objects and between a spacefaring object and the earth. The disclosed system can use existing communication systems on earth and earth's orbit to send and receive information. In one case, the disclosed space communication system can reduce the 11 minutes duration to send signals from mars to earth to about 2 minutes.

The disclosed system can include several satellites that are strategically positioned outside the earth's orbit. The satellites of the disclosed space communication system are also referred to herein as space communication transfer stations. Referring to FIG. 1 which shows the Earth 100, satellites 110 in an orbit of the Earth, and the disclosed space communication transfer stations 120 positioned outside the Earth's orbit. The disclosed space communication transfer stations can be relatively stationary to the earth. The disclosed space communication transfer stations can be in static positions relative to the earth and traveling in an orbit around the sun. The group of the disclosed space communication transfer stations strategically positioned outside the earth's orbit can always monitor space and blind spots of the earth.

The disclosed scape communication system can be reliable in emergency situations. Distress calls can be routed through the group of disclosed space communication transfer stations to reach the earth in the lowest possible duration.

The disclosed space communication transfer stations can have solar panels for power. Using the disclosed space communication transfer stations, two spacefaring objects can communicate with each other without sending the information to the earth. In case, an inbound object extremely far from the earth is detected heading towards the earth, and the sun is between the earth and the probe that detects the inbound object, the group of disclosed space communication transfer stations can transfer the warning message quickly to the earth.

In case, a human space mission experiences any danger or an emergency, the distress signal from the mission can be quickly routed to earth using the disclosed space communication system. For example, if a human mission on Titan (a moon of Saturn) faces an emergency, however, at the time of sending the distress signal, the orbits of total and earth are not aligned, it may take hours or days for the message to reach earth. The disclosed space communication system can capture the distress signal using one of the several strategic space communication transfer stations and can route the distress signal to the earth as quickly as possible.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A space communication system comprising:

a plurality of space communication transfer stations strategically positioned outside an earth's orbit and rotating within predetermined orbits around a sun, wherein the plurality of space communication transfer stations are strategically positioned to prevent blind spots on the earth, wherein the plurality of space communication transfer stations are stationary relative to earth, wherein each of the plurality of space communication transfer stations are configured to route a signal from one spacefaring object to another spacefaring object, wherein each of the plurality of space communication transfer stations is configured to route a signal from a spacefaring object to the earth, wherein the plurality of space communication transfer stations are capable of communicating with each other, wherein two spacefaring objects can communicate with each other without sending the information to the earth.

2. The space communication system according to claim 1, wherein each of the plurality of space communication transfer stations comprises solar panels.

* * * * *